United States Patent [19]

Griswold et al.

[11] Patent Number: 4,762,887
[45] Date of Patent: Aug. 9, 1988

[54] PROCESS FOR PREPARING ACRYLATE-FUNCTIONAL ORGANOPOLYSILOXANE-URETHANE COPOLYMERS

[75] Inventors: Roy M. Griswold, Hudson, Mich.; Douglas G. Vanderlaan, Jacksonville, Fla.

[73] Assignee: Wacker Silicones Corporation, Adrian, Mich.

[21] Appl. No.: 3,512

[22] Filed: Jan. 15, 1987

[51] Int. Cl.$^4$ .............................................. C08F 2/46
[52] U.S. Cl. ........................................ 522/99; 522/32; 522/33; 522/43; 522/46; 522/48; 522/49; 522/56; 522/62; 525/453; 525/454; 525/420; 528/24; 528/26; 528/28

[58] Field of Search ...................... 525/453, 454, 920; 528/26, 24, 28; 522/99, 32, 33, 43, 46, 48, 62, 49, 56

[56] References Cited

U.S. PATENT DOCUMENTS 4,116,786  9/1978  Hodakowski ........................ 522/77
4,301,209  11/1981  Lorenz et al. ........................ 522/77
4,606,933  8/1986  Griswold et al. .................... 522/99

Primary Examiner—Melvyn I. Marquis

[57] ABSTRACT

A process for preparing radiation polymerizable acrylate-functional organopolysiloxane-urethane copolymers by reacting aminofunctional polysiloxanes with acrylated urethane oligomers in the presence of a solvent.

11 Claims, No Drawings

PROCESS FOR PREPARING ACRYLATE-FUNCTIONAL ORGANOPOLYSILOXANE-URETHANE COPOLYMERS

The present invention relates to a process for preparing radiation and/or heat polymerizable compositions, particularly to a process for preparing radiation polymerizable silicone compositions and more particularly to a process for preparing radiation polymerizable acrylate-functional organopolysiloxane-urethane copolymer compositions.

BACKGROUND OF THE INVENTION

Radiation polymerizble coating compositions are described in U.S. Pat. No. 4,116,786 to Hodakowski, in which the compositions contain an acrylate-capped polyether urethane, a low molecular weight polyfunctional acrylate, a monofunctional acrylate and a small amount of a polyether-functional polysiloxane.

Also, radiation curable coating compositions are described in U.S. Pat. No. 4,301,209 to Lorenz et al, in which a polytetrahydrofuran, polycaprolactone polyols and other polyols are reacted with a diisocyanate to form an isocyanate terminated prepolymer and the isocyanate terminated prepolymer is then capped with a capping agent having terminal amine or hydroxy group and also contains an acrylic acid or methacrylic acid moiety.

Radiation polymerizable acrylate-functional polysiloxanes in which the acrylate containing group is bonded to a silicon atom via a silicon-carbon-nitrogen linkage is described in U.S. Pat. No. 4,606,933 to Griswold et al.

Generally, the compositions described in the Griswold patent are not soluble in commercially available multi-acrylated monomers and acrylated oligomeric compositions. This often results in nonuniform coatings which have undesirable physical properties.

Therefore, it is an object of this invention to provide a process for preparing acrylate-functional organopolysiloxane-urethane copolymers. Another object of this invention is to provide novel acrylate-functional organopolysiloxane-urethane copolymers that are reactive under radiation conditions even in the presence of oxygen. A further object of this invention is to provide novel acrylate-functional organopolysiloxane-urethane copolymer compositions which are soluble in multi-acrylated monomers and acrylated oligomeric compositions.

SUMMARY OF THE INVENTION

The foregoing objects and others which will become apparent from the following description are accomplished in accordance with this invention, generally speaking, by providing a process for preparing acrylate-functional organopolysiloxane-urethane copolymers which comprises reacting an aminofunctional organopolysiloxane with an acrylate functional urethane at a temperature of from about 25° C. up to about 150° C. in the presence of an inert organic solvent.

DESCRIPTION OF THE INVENTION

The copolymers of this invention are preferably prepared by reacting an aminofunctional polysiloxane containing primary and/or secondary amine groups with acrylated urethanes, and more preferably acrylated urethane oligomers.

Suitable examples of aminofunctional polysiloxanes having primary and/or secondary amine groups which are reacted with the acrylated urethanes are those having at least one unit of the formula

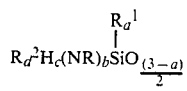

wherein R is a divalent radical selected from the group consisting of a saturated divalent hydrocarbon radical having up to 20 carbon atoms, a divalent hydrocarbonoxy radical in which the oxygen is in the form of an ether linkage or an unsaturated divalent hydrocarbon radical having 2 to 20 carbon atoms; $R^1$ is a monovalent hydrocarbon radical having from 1 to 20 carbon atoms; $R^2$ is a monovalent hydrocarbon radical having from 1 to 20 carbon atoms or a radical of the formula

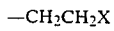

wherein X represents $-COOR^3$, $-CONR^3$, $-CN$, and $-SO_2R^3$ radicals; where $R^3$ is a monovalent hydrocarbon radical having from 1 to 20 carbon atoms; a is 0, 1 or 2, b is 1, 2 or 3, c is 1, 2, 3 or 4, and d is 0, 1, 2, or 3, with the proviso that $c = b - d + 1$.

Examples of divalent hydrocarbon radicals represented by R above are alkylene radicals such as ethylene, trimethylene, hexamethylene and octamethylene radicals.

Suitable examples of divalent hydrocarbonoxy radicals represented by R are hydrocarbonoxy radicals having the formulas $(C_2H_4O)_e(CH_2)_f$, $(C_3H_6O)_e(CH_2)_f$ and $(C_4H_8O)_e(CH_2)_f$, where e is a number of from 1 to 50 and f is a number of from 1 to 10. Specific examples of hydrocarbonoxy radicals are ethylene oxide, trimethylene oxide, tetramethylene oxide and polymers and copolymers thereof. Examples of unsaturated divalent hydrocarbon radicals are alkylene radicals such as vinylene, propenylene, butenylene and hexenylene radicals.

Suitable examples of monovalent hydrocarbon radicals represented by $R^1$, $R^2$ and $R^3$ are alkyl radicals such as methyl, ethyl, propyl, butyl, hexyl, octyl, decyl, dodecyl and octadeyl radicals; aryl radicals such as the phenyl radical; alkaryl radicals such as the tolyl, xylyl and ethylphenyl radicals; cycloalkyl radicals such as cyclobutyl, cyclohexyl and cyclodecyl radicals and aralkyl radicals such as the benzyl, 2-phenylethyl and 2-phenylpropyl radicals.

The aminofunctional organopolysiloxanes employed in the process of this invention are well known in the art. They may be prepared in accordance with the process described, for example, in U.S. Pat. No. 2,947,771 to Bailey, in which an aminofunctional silane is equilibrated with a siloxane in the presence of an alkali metal hydroxide. Also, they may be prepared in accordance with the process described in U.S. Pat. No. 3,598,853 to Friedman et al, in which an aminofunctional silane is condensed with a silanol terminated polysiloxane. Other methods for preparing aminofunctional siloxane fluids are described in U.S. Pat. Nos. 3,890,269 to Martin; 2,930,809 to Jex et al; and 3,045,036 to Jex et al. The aminofunctional siloxanes described in these references and their methods of preparation are incorporated herein by reference.

Specific examples of aminofunctional silanes which may be employed to form aminofunctional organopolysiloxanes are beta-aminopropyltrimethoxysilane, gamma-aminopropyltriethoxysilane, methyl-beta-(aminoethyl)-gamma-aminopropyldimethoxysilane, omega-aminohexyltributoxysilane, beta-(aminoethoxy)hexyltriethoxysilane, beta-(aminoethoxy)propyltrimethoxysilane, beta-(aminopropoxy)butyltributoxysilane, methyl-beta(aminopropoxy)propyldi(aminoethoxy)silane, gamma-aminopropylethyldiethoxysilane, gamma-aminopropylphenylethoxysilane, gamma-aminoisobutylmethyldiethoxysilane, bis(gamma-aminopropyl)tetramethyldisiloxane, and bis[N-ethyl(3-amino-2-methylpropyl)]tetramethyldisiloxane.

The acrylate functional urethanes are prepared by reacting an excess of organic polyisocyanate having at least two —NCO groups per molecule with an organic compound having at least two active hydrogen containing groups to form a urethane prepolymer containing —NCO groups.

In preparing the —NCO containing urethane prepolymers, any suitable organic polyisocyanate may be used including aliphatic, aromatic, cycloaliphatic and heterocyclic organic isocyanates. Specific examples of such polyisocyanates are 2,4-tolylene diisocyanate, 1,6-hexamethylenediisocyanate, 1,4-tetramethylenediisocyanate, 1,10-decamethylenediisocyanate, 1,5-naphthalenediisocyanate, cumene-2,4-diisocyanate, 3,5,5-trimethyl-2-cyclohexen-1-one diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'-diisocyanatodiphenyl, isophorone diisocyanate, 3,3'-dimethyl-4,4'-diisocyanatodiphenyl, 3,3'-dimethoxy-4,4'-diisocyanatodiphenyl, diphenylmethane diisocyanate, 2,5-fluorenediisocyanate, 1,8-naphthalenediisocyanate, 2,6-diisocyanatobenzfuran, and 2,4,6-toluenetriisocyanate.

Mixtures of isocyanates such as those containing 65 weight percent of 2,4-tolylene diisocyanate and 35 weight percent of 2,6-tolylene diisocyanate, as well as mixtures containing 80 weight percent 2,4-tolylene diisocyanate and 20 weight percent 2,6-tolylene diisocyanate may be employed.

Examples of active hydrogen containing groups are, for example, hydroxyl groups, primary amino groups, secondary amino groups, carboxyl groups (—COOH), mercapto groups, enolizable methylene groups and the like. The presence of the active hydrogen containing group can be determined by the well known Zerewitinoff Methods, J. Am. Chem. Soc. 49, 3181 (1927).

Examples of organic compounds having at least two active hydrogen containing groups are polyalkylene polyols having a molecular weight of at least 250. These polyalkylene polyols include polyesters, polyethers, alkylene glycols, polymercaptans and polyamines. The polyalkylene polyols may have active primary or secondary hydroxyl groups and may be a hydroxyl-containing polyether or polyester including fatty acid glycerides. The polyesters may be obtained by the esterification and condensation reaction of, for example, aliphatic dibasic carboxylic acids with glycols or triols or mixtures thereof in proportions such that the resultant polyesters may contain predominantly terminal hydroxy groups. Dibasic carboxylic acids suitable for preparing polyesters may include aliphatic and aromatic acids such as adipic acid, fumaric acid, sebacic acid, and phthalic acid. Examples of suitable polyols include ethylene glycols, diethylene glycols, trimethylolpropane, etc. The fatty acid glycerides include those having a hydroxyl number of at least 50 such as castor oils, hydrogenated castor oil or blown natural oils.

Other examples of polyalkylene polyols are polyalkylene glycols such as polyethylene glycols, and polypropylene glycols, preferably having a molecular weight at least 150.

The polyalkylene polyols may be prepared from alkylene oxides such as propylene oxide, butylene oxide, 1,2-amylene oxide as well as aralkylene oxides, such as styrene oxide. The polyols may also be prepared by condensing one of the above mentioned types of oxides with a polyhydric alcohol, such as alkane diols, e.g., ethylene glycol, 1,3-propane diol, 1,3-butane diol, 1,4-butane diol, 1,2-isopropane diol, 1,3-isobutane diol, 1,5-pentane diol, 1-methylpentane-1,4-diol, 1,6-hexane diol, 1,7-heptane diol, 1,8-octane diol, 1,16-pentadecane diol and the like; alkane triols such as 1,3,6-hexane triol, glycerine and the like; alkane polyols such as sorbitol; alkene diols such as 1,2-ethene diol, 1-butene-1,4-diol, propene-1,3-diol and the like; polyhydric ethers such as trimethylolpropane, pentaerythritol, polyethylene ether glycols, polypropylene ether glycols, and the like, and phenols such as, for example, hydroquinone, 4,4'-dihydroxy diphenylmethane, 4,4'-dihydroxy diphenyl dimethyl methane, 1,5-dihydroxy naphthalene and the like.

The above mentioned oxides may be condensed with aliphatic or aromatic polyamines such as alkylene diamines, e.g., ethylene diamine and the like, alkylene triamines, such as triethylene diamine and the like, aromatic amines, such as aniline, p-amino aniline and the heterocyclic amines such as piperazine and the like.

Also, condensation products of the above mentioned oxides with alcohol amines may be used. Examples of suitable alcohol amines are alkanol amines, such as ethanol amine; N-alkyl alkanol amines, such as N-methyl diethanol amine; trialkanol amines, such as triethanol amine; N,N,N',N'-tetrakis(2-hydroxy propyl)ethylene diamine and phenol amines, such as p-amino phenol and the like.

The preparation of urethane prepolymers containing —NCO groups is well known in the art. For example, these urethane prepolymers may be prepared by mixing the organic compound having at least two active hydrogen groups per molecule with an excess of organic polyisocyanate to form the urethane prepolymer having —NCO groups.

The reaction may take place at temperatures as low as 25° C. up to 125° C. in the presence or absence of a catalyst.

In preparing the prepolymer, it is preferred that the polyisocyanate be reacted with the organic compound in a mole ratio of —NCO group to active hydrogen group of at least 1.5:1 and more preferably in a mole ratio of —NCO group to active hydrogen group of 2:1.

Examples of catalysts which may be employed are tertiary amines such as triethylamine, diethylcyclohexylamine and alcohol amines such as dimethylethanolamine. Other catalysts which may be employed are tin compounds such as tin oleate, dibutyltin dilaurate, stannous octoate as well as cobalt naphthenate and manganese acetyl acetonate.

The —NCO containing prepolymers, whose preparation is described above, having at least two —NCO groups per molecule are reacted with hydroxy-containing acrylic and methacrylic functional compounds to form acrylate and methacrylate functional urethanes. The reaction may be conducted at a temperature above about 25° C. and up to about 150° C. and more preferably the reaction is carried out at a temperature of from about 50° C. to 125° C.

Examples of suitable hydroxy-containing acrylic and methacrylic compounds are hydroxyethyl methacrylate, 2-hydroxypropyl methacrylate, 1-methacryloxy dodecanol-2, 2-hydroxybutyl acrylate, 3-acryloxy-2-hydroxypropyl methacrylate, 3-methacryloxy-2-hydroxypropyl methacrylate, 3-crotonoxy-2-hydroxypropyl acrylate, 3-acryloxy-2-hydroxypropyl acrylate, 3-acryloxy-2-hydroxypropyl cinnamate, 3-allyloxy-2-hydroxypropyl methacrylate, 3-allyloxy-2-hydroxypropyl acrylate, 2-hydroxy octyl acrylate, 2-hydroxy-3-methacryloxypropyl acrylate, 2-hydroxy-3-phenoxypropyl acrylate, 2-hydroxy-3-propionoxypropyl acrylate, 2-hydroxy-3-benzoxypropyl acrylate and the like. Other hydroxy-containing acrylic and methacrylic compounds which may be employed are partial esters of polyhydric alcohols and acrylic and methacrylic acids, such as ethylene glycol monoacrylate, or monomethacrylate, 1,2- or 1,3-propanediol monoacrylate, 1,4-butanediol monoacrylate or monomethacrylate, trimethylolpropane diacrylate and glycerol diacrylate.

Still other hydroxy containing compounds which may be reacted with the —NCO containing prepolymer are hydroxyl containing acrylamides such as N,N'-(1,2-dihydroxyethylene)-bisacrylamide, N-hydroxymethylacrylamide, N-hydroxyethanol-acrylamide, N-hydroxypropylacrylamide, N-hydroxybutylacrylamide and the like.

Catalysts which may be used to promote the reaction are tin compounds, such as tin oleate, dibutylin dilaurate, stannous octoate; trialkylamines such as triethylamine, tripropylamine, tributylamine, triethanol amine, dimethylethanol amine; tertiary ester amines, as well as cobalt naphthenate and manganese acetyl acetonate.

In preparing the acrylate or methacrylate functional urethanes, the prepolymers containing at least two —NCO groups per molecule are reacted with the hydroxy-containing acrylic and methacrylic compounds in a mole ratio of —NCO group to OH group of from 0.5:1 to 1:0.5 and more preferably in a mole ratio of —NCO group to OH group of about 1:1.

The acrylate-functional organopolysiloxane-urethane copolymers are prepared by mixing the acrylate- or methacrylate-functional urethanes prepared above with an aminofunctional organopolysiloxane at a temperature of from about 25° C. up to about 150° C. and preferably at a temperature of from about 30° C. up to about 140° C. and more preferably at a temperature of from about 50° C. up to about 125° C. in the presence of an organic solvent.

The amount of acrylate-functional urethanes admixed with the aminofunctional organopolysiloxane is such that the mole ratio of acrylate groups of the acrylate compound to the amine groups of the aminofunctional organopolysiloxane is between 0.75 and 10, and more preferably from about 1 to 5 moles of acrylate-functional urethane per mole of amino group present on the aminofunctional organopolysiloxane.

Any organic solvent may be employed as long as it does not react with the reactants and the reaction products.

Examples of suitable organic solvents which may be employed are aliphatic hydrocarbons, such as hexane, heptane, octane, and aromatic hydrocarbons such as benzene, toluene and xylene. Other suitable solvents are alcohols such as methanol, ethanol and 2-propanol; ethers such as dioxane, diethyl ether, dibutyl ether, diethylene glycol dimethyl ether, ethylene glycol diethyl ether, diethoxyethane, tetrahydrofuran and halogenated hydrocarbons, such as 1,1,1-trichloroethane and the like. These solvents may be used alone or any combination thereof.

The organic solvent may range from about 5 percent to about 90 percent by weight based on the weight of the reactants and the solvent and more preferably may range from about 20 to about 80 percent by weight based on the weight of the reactants and the solvent.

The above described compositions may be used as a solvent solution or the solvent may be removed in vacuum at temperatures of from about 25° C. up to about 175° C., and more preferably at a temperature of from about 25° C. to 130° C.

The copolymers prepared in accordance with the above process are preferably fluids having viscosities of from 500 to 500,000 mPa.s and more preferably from 500 to 250,000 mPa.s at 25° C.

The compositions of this invention may be polymerized by exposing the compositions to a radiation source. Examples of radiation sources which may be employed are ionizing or actinic non-ionizing radiation such as electron beam, ultraviolet light, x-ray, gamma-ray and beta ray.

When the compositions are to be cured by exposure to nonionizing radiation source, such as ultraviolet light, then it is preferred that a photosensitizer be incorporated in the acrylate-functional organopolysiloxane urethane copolymer compositions of this invention.

Photosensitizers which may be employed are benzophenone, zanthone, thioxanthone, 2-chlorothioxanthone, benzoinisopropyl ether, benzoquinone, 1-chloroanthraquinone, p-diacetylbenzene, 9,10-dichloroanthracene, 4,4-dichloroanthraquinone, ;b 1,3-diphenyl-2-propane, 1,4naphthylphenyl ketone, 2,3-pentanedione, 1-hydroxycyclohexylphenyl ketone, mixtures of benzophenone and tertiary amines, such as N,N-dimethylethanolamine and diazo compounds which dissociate into free radicals, such as N,N-azobisisobutyronitrile.

The photosensitizers are preferably used in an amount up to about 15 weight percent, based on the weight of the acrylate-functional organopolysiloxane-urethane copolymers. More preferably, the photosensitizer is present in an amount of from about 0.5 to about 10 weight percent, based on the weight of the acrylate-functional organopolysiloxane-urethane copolymers.

The radiation polymerizable compositions of this invention may be stabilized against a premature polymerization during storage by the addition of a conventional polymerization inhibitor such as hydroquinone, monomethyl ether of hydroquinone, phenothiazine and di-t-butyl paracresol in concentrations on the order of about 0.1 weight percent or less based on the weight of the radiation curable composition.

Polymerization may be carried out in an air atmosphere or in an inert atmosphere such as argon or nitrogen. The time required to polymerize a coating containing the acrylate- or methacrylate-functional organopolysiloxane-urethane copolymers varies with such factors as the particular composition used, type and wavelength of radiation, energy flux, concentration of the photosensitizer and the thickness of the coating; however, it is generally relatively short, that is, less than about 10 seconds.

The compositions of this invention may also be thermally polymerized or they may be polymerized in the presence of a free radical initiator, such as an organic peroxide. When an organic peroxide is employed, it is preferably employed in an amount of from about 0.1 to 10 weight percent based on the weight of the acrylate-functional organopolysiloxane-urethane copolymers.

Examples of suitable organic peroxides are benzoyl peroxide, dibenzoyl peroxide, di-t-butyl peroxide, t-butylbenzoyl peroxide, cumene hydroperoxide, dicumyl peroxide, lauroyl peroxide, alpha, alpha'-bis(t-butylperoxy)diisopropylbenzene, 2,5-bis(t-butylperoxy)-2,5-dimethylhexane and t-butyl perbenzoate.

In addition to the aforementioned components, the compositions of this invention may also contain other additives such as diluents, flow control agents, levelling agents, inhibitors, pigments and the like.

Examples of reactive diluents which may be added to the compositions of this invention are ethyl acrylate, n-amyl acrylate, benzyl acrylate, cyclohexyl acrylate, 2-(N-methylcarbamoyloxy)ethylacrylate, diethylaminoethyl acrylate, 2-ethoxyethyl acrylate, n-lauryl acrylate, n-octyl acrylate, octadecyl acrylate, vinylacetate, and N-vinylpyrrolidone and others. The corresponding methacrylate esters may be used; however, they are less desirable. If desired, a low viscosity siloxane fluid having a single acrylate or methacrylate group bonded thereto may be employed as a diluent. The diluent can be employed in an amount of from about 0.001 to about 99 weight percent based on the weight of the acrylate-functional organopolysiloxane-urethane copolymers and more preferably in an amount of from about 10 to 95 weight percent based on the weight of the acrylate-functional organopolysiloxane-urethane copolymers.

The copolymers of this invention may be applied to various substrates, such as paper, wood, glass, polycarbonates, polyesters, polymethylmethacrylates and metal surfaces such as aluminum, steel, copper and brass and then polymerized in the presence of a radiation source or heat.

The compositions of this invention may be used to form clear and pigmented coatings on paper substrates and pigmented coatings on metal and glass substrates, as coatings for fiber glass, as overprint varnishes, as flexographic and gravure inks, and as wood coatings.

The acrylate-functional organopolysiloxane-urethane copolymers of this invention are soluble in multiacrylate monomer(s) and/or acrylate oligomeric compositions. This property has certain advantages when the copolymer is used as an additive for imparting silicone characteristics to the resultant compositions. Among the characteristics imparted to the compositions, are improved flow, wetting, defoaming, gloss, adhesion, flexibility, and abrasion resistance, as well as reduced shrinkage and coefficient of friction values.

Specific embodiments of this invention are further illustrated in the following examples in which all parts are by weight unless otherwise specified.

Preparation of Acrylate/Methacrylate-Functional Urethanes (A) About 348 parts of toluene diisocyanate are mixed with 62 parts of ethylene glycol and reacted at room temperature (25° C.) to form a diurethane diisocyanate. About 260 parts of hydroxyethyl methacrylate are added to the resultant diurethane diisocyanate and the mixture heated to about 80° C. for about 3 hours.

(B) About 348 parts of toluene diisocyanate are mixed with 90 parts of 1,3-butylene glycol and reacted at 30° C. to form a diurethane diisocyanate. About 260 parts of hydroxyethyl methacrylate are added to the resultant diurethane diisocyanate and the mixture heated at 50° C. until the —NCO content is zero.

(C) About 348 parts of toluene diisocyanate are mixed with 90 parts of 1,4-butylene glycol and 232 parts of hydroxyethyl acrylate and heated for about seven hours at about 80° C. until the —NCO content is zero.

(D) About 348 parts of toluene diisocyanate are mixed with 200 parts of polyethylene glycol "200" and 288 parts of 2-hydroxypropyl methacrylate and heated for about six hours at a temperature of about 80° until the —NCO content is zero.

Preparation of Aminofunctional Polysiloxane Fluid (E) A mixture containing 296 parts of octamethylcyclotetrasiloxane, 60 parts of 2-aminoethyl-3-aminopropyltriethoxysilane and 0.2 parts of potassium hydroxide is heated to 145° C. and maintained at this temperature for three hours. The resultant product is cooled to 45° C., then 0.2 parts of acetic acid are added to the product filtered. The base equivalent of the resultant product is 1.3 milliequivalents per gram.

(F) A mixture containing 296 parts of octamethylcyclotetrasiloxane, 134.6 parts of hexamethydisiloxane, 123 parts of 2-aminoethyl-3-aminopropyltrimethoxysilane, 44 parts of water and 0.6 parts of potassium hydroxide is heated to reflux and the methanol-water azeotrope is collected up to a temperature of 145° C. The resultant product is cooled to 45° C., then 0.6 parts of acetic acid are added and the resultant product filtered. The base equivalent of the resultant product is 2.0 milliequivalents per gram.

(G) A mixture containing 30 parts of silanol chain-stopped polydimethylsiloxane of the formula

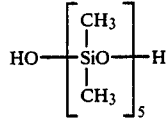

and 37 parts of 3-(3-aminopropoxy)propyltrimethoxysilane is heated to 145° C. and the methanol is removed. The resultant product is cooled to 45° C. and filtered. The base equivalent of the resultant product is 2.6 milliequivalents per gram.

(H) A flask containing 40.4 parts of bis(N-ethyl-2-methylpropyl)tetramethyldisiloxane, 458.6 parts of octamethylcyclotetrasiloxane and 0.5 parts of potassium hydroxide is heated to a temperature of from 150° to 160° C. for 20 hours. The catalyst is neutralized with 0.54 parts of acetic acid and the reaction product devolatized at 150° C. at less than 1 torr. The base equivalent of the resultant product is 0.5 milliequivalents per gram. Nuclear Magnetic Resonance analysis of the product indicates a ratio of $(CH_2)_2N:OSi(CH_3)_2$ of 2.0:49.5.

(I) A flask containing 249.54 parts of 3-aminopropyltriethoxysilane, 748.2 parts of hexamethylcyclotrisiloxane and about 1 part of lithium hydroxide is heated to about 100° C. with agitation for about 2 hours. The reactants are cooled to 59° C., then neutralized with 1.4 parts of acetic acid and the resultant product is devolatized at 100° C. at less than 1 torr. The base equivalent of the resultant product is 1.2 milliequivalents per gram. Nuclear Magnetic Resonance analysis of the product indicates a ratio of $OCH_2:CH_2N\text{-}OSi(CH_3)_2$ of 2.7:1.0:7.2.

EXAMPLE 1

About 33.5 parts of the methacrylate-functional urethane prepared in Example (A) above is added to a reactor containing a stirrer and condenser. About 35.6 parts of an aminofunctional polysiloxane fluid prepared in accordance with Example (E) above, 20 parts of isopropanol and 5 parts of toluene are added to the reactor and refluxed for 7 hours. The volatile products are distilled off at less than 1 torr.

A film about 2 microns in thickness in cast on a glass plate from a solution containing 5 parts of the product prepared above, 0.15 parts of 1-hydroxy-cyclohexylphenyl ketone (available as Irgacure ® 184 from Ciba-Geigy Corporation) and 5 parts of isopropanol. The coated glass plate is placed in an air oven at 75° C. to remove the solvent and then passed under two ultraviolet lamps, each of which provides 180 watts per inch at 50 feet per minute to form an elastomeric film.

EXAMPLE 2

The procedure of Example 1 is repeated, except that 34.9 parts of the methacrylate-functional urethane prepared in accordance with Example (B) above are substituted for the methacrylate-functional urethane prepared in Example (A).

An elastomeric film is formed on the glass plate after being exposed to ultraviolet light.

EXAMPLE 3

The procedure of Example 1 is repeated, except that 33.5 parts of the acrylate-functional urethane prepared in accordance with Example (C) above are substituted for the methacrylate-functional urethane prepared in Example (A).

An elastomeric film is formed on the glass plate after being exposed to ultraviolet light.

EXAMPLE 4

The procedure of Example 1 is repeated, except that 41.8 parts of the methacrylate-functional urethane prepared in accordance with Example (D) above are substituted for the methacrylate-functional urethane prepared in Example (A) above.

An elastomeric film is formed on the glass plate after being exposed to ultraviolet light.

EXAMPLE 5

The procedure of Example 1 is repeated, except that 53.8 parts of the aminofunctional polysiloxane fluid prepared in accordance with Example (F) above are substituted for the aminofunctional polysiloxane prepared in (E) above.

An elastomeric film is formed on the glass plate after being exposed to ultraviolet light.

EXAMPLE 6

The procedure of Example 1 is repeated, except that 50 parts of the aminofunctional polysiloxane fluid prepared in accordance with Example (G) above are substituted for the aminofunctional polysiloxane fluid prepared in (E) above.

When a film of the resultant product is placed on a glass plate, it cures to an elastomeric solid when exposed to ultraviolet light.

EXAMPLE 7

The procedure of Example 1 is repeated, except that 25 parts of the aminofunctional polysiloxane fluid prepared in accordance with Example (H) above are substituted for the aminofunctional polysiloxane fluid prepared in (E) above.

A film of the resultant product cures to an elastomeric solid when exposed to ultraviolet light.

EXAMPLE 8

The procedure of Example 1 is repeated, except that 25 parts of the aminofunctional polysiloxane fluid prepared in accordance with Example (I) above are substituted for the aminofunctional polysiloxane fluid prepared in (E) above.

A film placed on a glass plate cures to an elastomeric solid when exposed to ultraviolet light.

EXAMPLE 9

To a flask equipped with a stirrer and condenser is added 50.0 parts of isopropanol, 10.0 parts of toluene, 19.5 parts of acrylated aromatic urethane product, identified as Chempol 19-4827 (available from Radcure Specialities, Inc.) and 25.0 parts of the aminofunctional polysiloxane fluid prepared in accordance with the procedure described in Example (H) above, except that the aminofunctional siloxane fluid has a base equivalent of 0.6 milliequivalents per gram and a Nuclear Magnetic Resonance analysis ratio of $(CH_2)_2N:OSi(CH_3)_2$ of 2.0:38.1. The mixture is refluxed at 79° C. for 6.5 hours and then the resultant product is devolatized to 30° C. at less than 1 torr. Nuclear Magnetic Resonance analysis of the resultant product indicates a ratio of $$CH_2=CHC\overset{O}{\overset{\|}{C}}:CH_2(CH_2N \text{ and } CH_2C\overset{O}{\overset{\|}{C}}):OSi(CH_3)_2 \text{ of } 1.1:13.5:38.1.$$

A thin film is cast upon a glass plate from a solution containing 5 parts of the product prepared above, 0.15 parts of 1-hydroxycyclohexylphenyl ketone (available as Irgacure ® 184 from Ciba-Geigy Corporation) and 5 parts isopropanol. The coated glass plate is placed in an air oven at 75° C. to volatize the solvent and then passed under two ultraviolet lamps, each of which provides 180 watts per inch at 50 feet per minute to form an elastomeric film.

EXAMPLE 10

To a flask equipped with a stirrer and condenser is added 59.2 parts of isopropanol, 14.8 parts of toluene, 8.1 parts of tripropylene glycol diacrylate, 40.4 parts of an acrylated aromatic urethane product, identified as Chempol 19-4827 (available from Radcure Specialities, Inc.) and 100 parts of an aminofunctional polysiloxane fluid prepared in accordance with the procedure described in Example (H) above. The mixture is refluxed at 79° C. for 12 hours and then the resultant product is devolatized to 60° C. at less than 1 torr. Nuclear Magnetic Resonance analysis of the resultant product indicates a ratio of

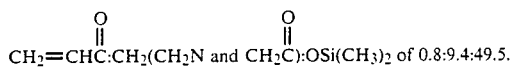
$CH_2=CHC:CH_2(CH_2N$ and $CH_2C):OSi(CH_3)_2$ of 0.8:9.4:49.5.

A thin, elastomeric film is formed when the composition is exposed to a radiation source in accordance with the procedure described in Example 9.

EXAMPLE 11

To a flask equipped with a stirrer and condenser is added 292.5 parts of isopropanol, 59 parts of toluene, 75.0 parts of an acrylated aromatic urethane product, identified as Chempol 19-4827 (available from Radcure Specialities, Inc.) and 185.2 parts of the aminofunctional polysiloxane fluid prepared in accordance with the procedure described in Example (H) above, except that the aminofunctional siloxane fluid has a base equivalent of 0.3 milliequivalents per gram and a Nuclear Magnetic Resonance analysis ratio of $(CH_2)_2N:OSi(CH_3)_2$ of 2.0:95.5. The mixture is refluxed at 86° C. for 11.5 hours and then devolatized to 55° C. at less than 1 torr. Nuclear Magnetic Resonance analysis of the resultant product indicates a ratio of

$CH_2=CHC:CH_2(CH_2N$ and $CH_2C):OSi(CH_3)_2$ of 0.9:8.2:95.5.

A thin film is cast on a glass plate and exposed to a radiation source in accordance with the procedure described in Example 9 to form an elastomeric film.

EXAMPLE 12

To a flask equipped with a stirrer and condenser is added 54 parts of isopropanol, 13.5 parts of toluene, 86.4 parts of an acylated aromatic urethane product, identified as Chempol 19-4827 (available from Radcure Specialties, Inc.) and 48.9 parts of aminofunctional polysiloxane fluid prepared in accordance with the procedure described in Example (H) above, except that the aminofunctional siloxane fluid has a base equivalent of 1.0 milliequivalent per gram and a Nuclear Magnetic Resonance analysis ratio of $(CH_2)_2N:OSi(CH_3)_2$ of 2.0:23.0. The mixture is refluxed at 79° C. for 12 hours and the product is devolatized to 60° C. at less than 1 torr. Nuclear Magnetic Resonance anlysis of the resultant product indicates a ratio of

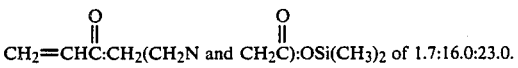
$CH_2=CHC:CH_2(CH_2N$ and $CH_2C):OSi(CH_3)_2$ of 1.7:16.0:23.0.

When a thin film is applied to a glass substrate and exposed to a radiation source in accordance with the procedure described in Example 9, it forms an elastomeric coating on the glass.

EXAMPLE 13

To a flask equipped with a stirrer and condenser is added 37.2 parts of isopropanol, 9.3 parts toluene, 73.2 parts of an acrylated aromatic urethane product, identified as Chempol 19-4827 (available from Radcure Specialties, Inc.) and 20.0 parts of an aminofunctional polysiloxane fluid prepared in accordance with the procedure described in Example (I) above. The mixture is refluxed at 79° C. for 12 hours. The product is devolatized to 60° C. at less than 1 torr. Nuclear Magnetic Resonance analysis of the resultant product indicates a ratio of

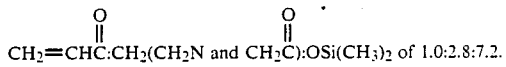
$CH_2=CHC:CH_2(CH_2N$ and $CH_2C):OSi(CH_3)_2$ of 1.0:2.8:7.2.

A thin film is applied to a glass substrate and exposed to a radiation source in accordance with the procedure described in Example 9. The resultant film cures to an elastomer.

EXAMPLE 14

To a flask equipped with a stirrer and condenser is added 107.0 parts of isopropanol, 50.0 parts of an acrylated aromatic urethane product, identified as CMD 6700 (available from Interez Corporation) and 57.0 parts of an aminofunctional polysiloxane fluid prepared in accordance with the procedure described in Example (H) above having a base equivalent of 0.5 milliequivalents per gram and a Nuclear Magnetic Resonance analysis ratio of $(CH_2)_2N$-$OSi(CH_3)_2$ of 2.0:49.5. The mixture is refluxed at 81° C. for 12 hours and then devolatized to 50° C. at less than 1 torr. Nuclear Magnetic Resonance analysis of the product indicates a ratio of

$CH_2=CHC:CH_2(CH_2N$ and $CH_2C):OSi(CH_3)_2$ of 2.8:20.7:49.5.

An elastomeric film is obtained when the composition is applied to a glass substrate and exposed to a radiation source in accordance with Example 1.

EXAMPLE 15

To a flask equipped with a stirrer and condenser is added 150.0 parts of isopropanol, 25.0 parts of toluene, 100.0 parts of an acrylated aromatic urethane product, identified as CMD 6700 (available from Interez Corporation) and 28.7 parts of an aminofunctional polysiloxane fluid prepared in accordance with the procedure described in Example (H) above. The mixture is refluxed at 79° C. for 12 hours. The product is devolatized to 60° C. at less than 1 torr. Nuclear Magnetic Resonance analysis of the product indicates a ratio of

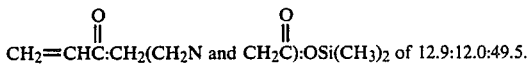
$CH_2=CHC:CH_2(CH_2N$ and $CH_2C):OSi(CH_3)_2$ of 12.9:12.0:49.5.

An elastomeric film is obtained when the composition is applied to a glass substrate and exposed to a radiation source in accordance with Example 1.

EXAMPLE 16

To a flask equipped with a stirrer and condenser is added 180.0 parts of isopropanol, 27.8 parts of an acrylated aliphatic urethane product, identified as CMD 8800 (available from Interex Corporation) and 50.0 parts of the aminofunctional polysiloxane fluid prepared in accordance with the procedure described in Example (H) above. The mixture is refluxed at 84° C. for 8 hours and the resultant product is devolatized to 35° C. at less than 1 torr. Nuclear Magnetic Resonance analysis of the product indicates a ratio of

$$CH_2=CHC:CH_2(CH_2N \text{ and } CH_2C):OSi(CH_3)_2 \text{ of } 0.7:4.6:49.5.$$

When the product is applied to a glass substrate as a thin film and exposed to a radiation source in accordance with Example 1, it forms an elastomeric film on the substrate.

EXAMPLE 17

To a flash equipped with a stirrer and condenser is added 546.4 parts of isopropanol, 72.5 parts of toluene, 19.5 parts of an acrylated aliphatic urethane product identified as Photomer 6008 (availale from Diamond Shamrock Corporation) and 100 parts of an amionfunctional polysiloxane fluid prepared in accordance with the procedure described in Example (H) above. The mixture is refluxed at 79° C. for 12 hours and the resultant product is devolatized to 60° C. at less than 1 torr. Nuclear Magnetic Resonance analysis of the product indicates a ratio of

$$CH_2=CHC:CH_2(CH_2N \text{ and } CH_2C):OSi(CH_3)_2 \text{ of } 0.8:14.2:49.5.$$

When the product is applied to a glass substrate as a thin film and exposed to a radiation source in accordance with Example 1, it forms an elastomeric film on the substrate.

EXAMPLE 18

The procedure of Example 17 is repeated, except that 45.4 parts of an aminofunctional polysiloxane fluid prepared in accordance with the procedure described in Example (H) above, having a base equivalent of 1.1 milliequivalents per gram and a Nuclear Magnetic Resonance analysis ratio to $(CH_2)_2N:OSi(CH_3)_2$ of 2.0:23.0 is substituted for 100 parts of the aminofunctional polysiloxane fluid having a base equivalent of 0.5 milliequivalents per gram. The resultant product has a Nuclear Magnetic Resonance analysis ratio of

$$CH_2=CHC:CH_2(CH_2N \text{ and } CH_2C):OSi(CH_3)_2 \text{ of } 0.8:8.3:23.0.$$

When the product is applied to a glass substrate as a thin film and exposed to a radiation source in accordance with Example 1, it forms an elastomeric film on the substrate.

What is claimed is:

1. A process for preparing radiation polymerizable acrylate-functional organopolysiloxane-urethane copolymers which comprises reacting an aminofunctional polysiloxane fluid having at least one unit of the formula

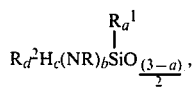

where R is a divalent radical selected from the group consisting of a saturated divalent hydrocarbon radical having up to 20 carbon atoms, a divalent hydrocarbonoxy radical in which the oxygen atom is in the form of an ether linkage and an unsaturated divalent hydrocarbon radical having from 2 to 20 carbon atoms, $R^1$ is a monovalent hydrocarbon radical having from 1 to 20 carbon atoms, $R^2$ is a radical selected from the group consisting of a monovalent hydrocarbon radical having from 1 to 20 carbon atoms and a radical of the formula $$CH_2CH_2X,$$

where X is selected from the group consisting of $COOR^3$, $CONR^3$, $CN$ and $SO_2R^3$, $R^3$ is a monovalent hydrocarbon radical having from 1 to 20 carbon atoms, a is 0, 1 or 2, b is 1, 2 or 3, c is 1, 2, 3 or 4 and d is 0, 1, 2 or 3, with the proviso that c equals $b-d+1$ with an acrylated urethane oligomer in a mole ratio of acrylate groups to amine groups of from 0.75 to 10 in the presence of an organic solvent at a temperature of from 25° to 150° C., in which the acrylated urethane oligomer is obtained by reacting an organic compound having at least two active hydrogen groups with an excess of an organic polyisocyanate having at least two —NCO groups per molecule to form a urethane prepolymer having at least two —NCO groups per molecule and thereafter the —NCO containing prepolymer is reacted with a hydroxy-containing compound selected from the group consisting of an acrylic compound, a methacrylic compound, and an acrylamide compound in a mole ratio of —NCO group to OH group of from 0.5:1 to 1:0.5 at a temperature of from 25° to 150° C.

2. The process of claim 1, where the molar ratio of acrylate groups to amine groups ranges from 1 to 5.

3. The process of claim 1, wherein the organic solvent is selected from the group consisting of aliphatic hydrocarbons, aromatic hydrocarbons, alcohols, ethers and halogenated hydrocarbons.

4. Radiation polymerizable acrylate-functional organopolysiloxane-urethane copolymers prepared in accordance with the process of claim 1.

5. A radiation polymerizable composition containing the acrylate-functional organopolysiloxaneurethane copolymers prepared in claim 1 and a photosensitizer.

6. The composition of claim 5, wherein the photosensitizer is present in an amount up to 15 weight percent, based on the weight of the acrylate-functional organopolysiloxane-urethane copolymers.

7. The composition of claim 5, wherein the photosensitizer is present in an amount of from about 0.5 to about 10 weight percent, based on the weight of the acrylate-functional organopolysiloxane-urethane copolymers 8. The composition of claim 5, wherein the composition contains from 0.001 to about 99 weight percent based on the weight of the acrylate-functional organopolysiloxane-urethane copolymers of a reactive diluent selected from the group consisting of ethylacrylate, n-amyl acrylate, benzyl acrylate, cyclohexyl acrylate, 2-(N-methylcarbamoyloxy)ethylacrylate, diethylaminoethyl acrylate, 2-ethoxyethyl acrylate, lauryl acrylate, n-octyl acrylate, octadecyl acrylate and the correspnding methacrylate esters, vinyl acetate and N-vinyl pyrrolidone.

9. A heat polymerizable composition containing the acrylate-functional organopolysiloxane-urethane copolymers prepared in claim 1 and an organic peroxide.

10. The composition of claim 9, wherein the organic peroxide is present in an amount of from 0.1 to 10 weight percent based on the weight of the acrylate-functional organopolysiloxane-urethane copolymers.

11. The composition of claim 9, wherein the composition contains from 0.001 to about 99 weight percent based on the weight of the acrylate-functional organopolysiloxane-urethane copolymers of a reactive diluent selected from the group consisting of ethyl acrylate, n-amyl acrylate, benzyl acrylate, cyclohexyl acrylate, 2-(N-methylcarbamoyloxy)ethylacrylate, diethylaminoethyl acrylate, 2-ethoxyethyl acrylate, lauryl acrylate, n-octyl acrylate, octadecyl acrylate and the corresponding methacrylate esters, vinyl acetate and N-vinyl pyrrolidone.

* * * * *